Jan. 5, 1932.        J. W. WHITE        1,839,818

WHEEL

Filed Feb. 24, 1928

Inventor
JOHN WILLIAM WHITE

By Clarence S. Walker
Attorney

Patented Jan. 5, 1932

1,839,818

UNITED STATES PATENT OFFICE

JOHN WILLIAM WHITE, OF BUFFALO, NEW YORK, ASSIGNOR TO KELSEY-HAYES WHEEL CORPORATION, OF DETROIT, MICHIGAN, A CORPORATION OF NEW YORK

WHEEL

Application filed February 24, 1928. Serial No. 256,761.

This invention relates to an improvement in wheels and more particularly to balancers adapted to be removably secured to the spokes of a wire wheel.

It has been found that while the wire wheel, when completed, is perfectly balanced, the application of the tire thereto disturbs this balance both by reason of the tire valve and also by reason of inequalities in thickness often found in the body of the tire. Consequently, when the wheel is equipped with the tire, it may be out of balance and does not lend itself to a perfect operation.

The primary object of this invention is to provide balancers, which can be quickly and removably secured to the spokes of the wheel at the rim in order to correct these inequalities and to restore the balance of the wheel.

A further object of this invention is to provide a balancer composed of two blocks having recesses which, when the blocks are assembled, form a passage to receive the spoke and a depression to receive the cup formed in the rim of the wheel through which cup the spoke is secured to the rim.

Other objects will appear from the following specification taken in connection with the drawings which form a part thereof; and in which Figure 1 is a side elevation of a portion of a spoke and rim equipped with a balancer embodying one form of this invention;

Figure 2:
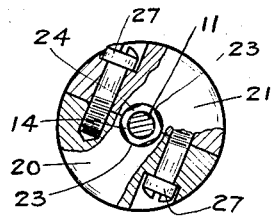
Figure 2 is a plan view of the balancer and of the spoke, certain parts being broken away.

In the drawings the reference number 10 is employed to designate the rim of a wire wheel to which is secured the outer end of a spoke 11. In accordance with the usual custom the rim 10 is provided with a cup 12 having a radial opening 13 therein through which extends a nipple 14, which is secured to the threaded end 15 of the spoke 11. As is clearly shown in the drawings, the head 16 of the nipple seats in the cup 12 and is held there against vibration.

Figure 3:
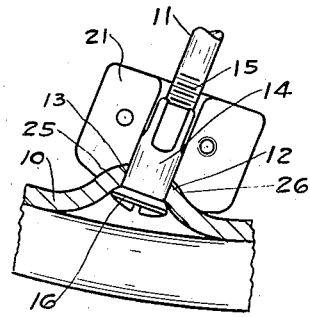
Figure 3 is a side elevation of one of the balancer blocks in position upon the spoke.
Figure 1:
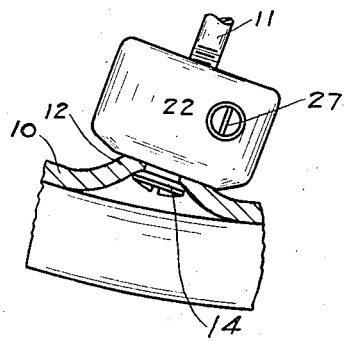

The embodiment set forth in Figs. 1, 2, and 3 comprises a pair of blocks 20 and 21 preferably semi-cylindrical in form so that when they are assembled they will constitute a cylindrical balancer 22. The blocks 20 and 21 are each provided with recesses 23, which, when the blocks are assembled as shown in Fig. 2, form a central passage 24 which receives the spoke 11 and the nipple 14. The blocks 20 and 21 are also provided with recesses 25, which, when the blocks are assembled, form a depression 26, which receives the cup 12 of the rim. The blocks 20 and 21 are clamped together and thus secured in the assembled position by means of bolts 27 which extend at either side of the spoke 11.

Figure 5:
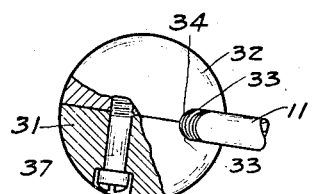
Figure 5 is a plan view with parts broken away of this second embodiment.
Figure 6:
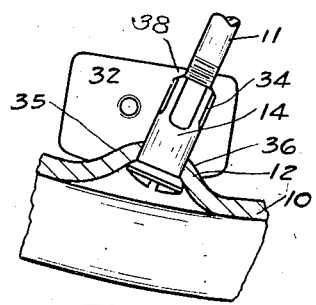
Figure 6 is a side elevation of a portion of the rim and spoke with which is assembled a portion of the second form of balancer.
Figure 4:
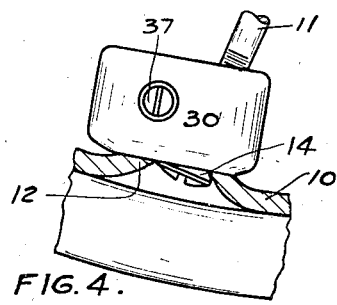
Figure 4 is a view similar to Figure 1 showing in side elevation, another embodiment of this invention.

The embodiment shown in Figs. 4, 5 and 6 is similar in many respects to that previously described and comprises a balancer 30 consisting of blocks 31 and 32, each of said blocks being provided with a recess 33, which, when the blocks are assembled, form a passage 34 to receive the spoke 11 and the nipple 14. The blocks 31 and 32 are also provided with recesses 35, which, when the blocks are assembled, form depressions 36 which receive the cups 12 on the rim 11. In this embodiment the passage 34 is not of the same diameter throughout but is contracted slightly at its inner edge by means of a flange 38 so that, while it will receive the spoke 11, it will not receive the nipple 14. The blocks 31 and 32 are clamped together and thus secured on the spoke by means of a bolt 37 as shown in Figs. 4 and 5.

When the wheel with its tire is found to be out of balance the necessary number of balancers are secured to the spokes in order to correct this inequality. The balancers are applied by placing the two blocks at either side of the spoke 11 bearing against the nipple 14 alone in the first embodiment and against the nipple 14 as well as against the spoke 11 in the second embodiment. The cups 12 are hemispherical in form and the depressions 26 or 36 are similarly formed so that they will engage the outer surface of the cup regardless of the angular relation of the spoke to the cup. When the parts have been assembled as shown they are clamped in this position either by means of the bolts 27 in the first embodiment, or by means of the bolt 37 in the second embodiment. The wheel will require rebalancing from time to time, due to a change of tires, and the operations above described may be repeated as often as necessary.

While certain embodiments have been shown and described, applicant is not to be limited thereto since obviously other improvements could be made without departing from the spirit and scope of the invention as set forth in the following claims.

I claim:

1. A balancer adapted for use with a wire wheel having spokes threaded into nipples seated in cups formed in the rim, consisting of a pair of blocks having recesses which coincide, when said blocks are assembled, and form a passage to receive a nipple and a depression to receive the cup, in which said nipple is seated, and means operable independent of the nipple and spoke for clamping said blocks in the assembled position upon said nipple.

2. A balancer adapted for use with a wire wheel having spokes laced into cups formed in the rim, consisting of a pair of blocks having recesses which coincide, when said blocks are assembled, and form a passage to receive a spoke and a depression to receive the cup into which said spoke is laced, and means for securing said blocks in the assembled position upon said spoke.

3. A balancer adapted for use with a wheel having spokes consisting of a pair of blocks having recesses which coincide, when said blocks are assembled, and form a passage to receive a spoke, and means for clamping said blocks in the assembled position upon said spoke.

4. Balancing means for spoked wheels comprising a balancing weight formed of a plurality of sections having recesses therein cooperating in the assembled position of the weight to form a passage for receiving one of the spokes of the wheel, and means operable independent of the spoke for clamping the sections thereto.

5. Balancing means for spoked wheels comprising a balancing weight formed of a plurality of sections arranged upon opposite sides of one of the wheel spokes and means for clamping said sections to the spoke.

Signed by me at Buffalo, New York, this twentieth day of February, 1928.

JOHN WILLIAM WHITE.